Oct. 19, 1937.   C. E. MILLER   2,096,189
INTERNAL COMBUSTION ENGINE
Filed Aug. 26, 1935
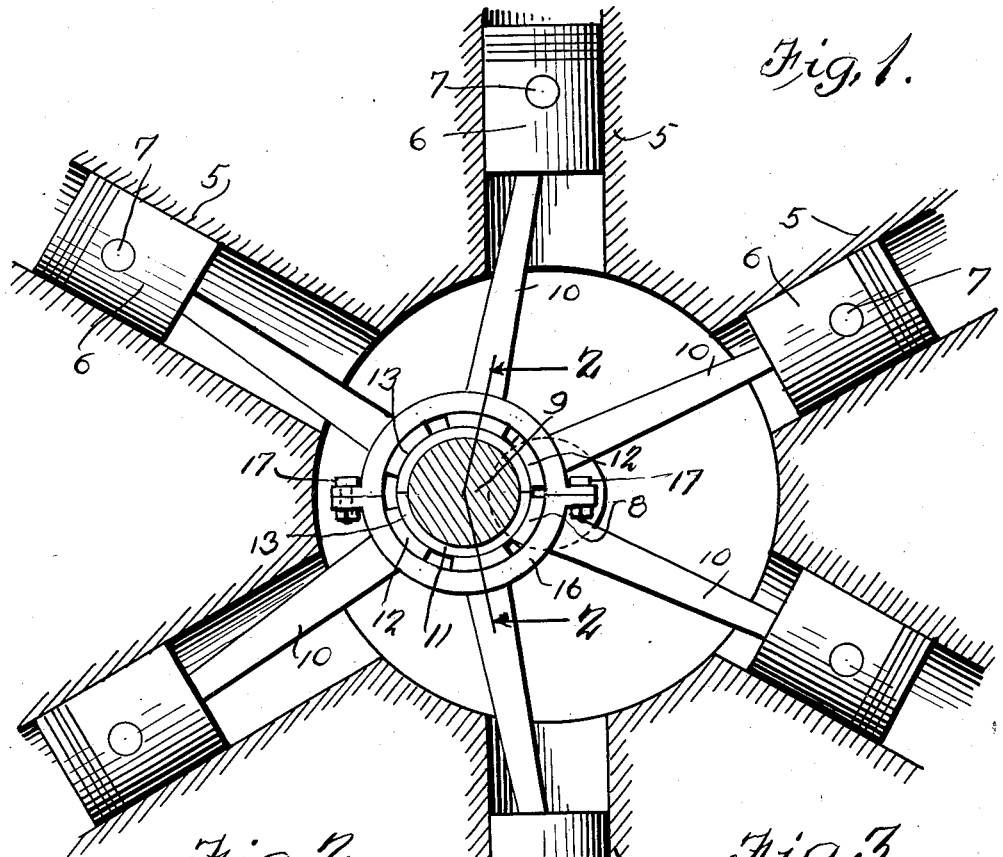
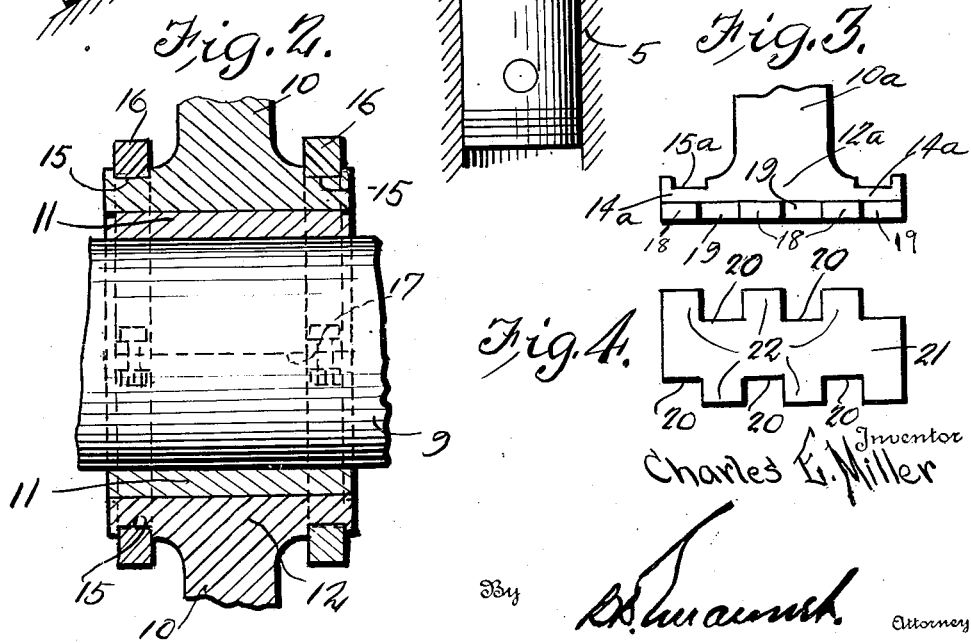
Charles E. Miller, Inventor Patented Oct. 19, 1937

2,096,189

UNITED STATES PATENT OFFICE 2,096,189

INTERNAL COMBUSTION ENGINE

Charles E. Miller, Anderson, Ind.

Application August 26, 1935, Serial No. 37,990

2 Claims. (Cl. 74—580)

This invention relates to internal combustion engines, and more particularly to engines having radiating cylinders.

The primary object of this invention is to provide a connection between the connecting rod of a radial type engine and the crank shaft requiring a minimum number of parts and allowing complete lubrication of the crank shaft throw surrounding the area upon which the connecting rods are attached.

A further object of this invention is to provide a connecting rod having a crank throw engaging portion provided with slots for allowing the interfitting and sliding movement about the circumference of the crank shaft throw without binding and the resultant breakage thereto.

A further object of this invention is to provide a crank throw connection including a floating ring interposed between the connecting rod bearing portion and the crank shaft throw to further insure against a binding action and to allow the free passage of oil to the bearing surfaces.

Other objects and advantages of the invention will become apparent during the course of the following description, taken with the drawing, wherein, Figure 1 is a vertical cross-sectional view through a radial motor, showing in detail the connection between the crank throw and piston;

Figure 2 is an axial cross-sectional view taken on line 2—2 of Figure 1, looking in the direction of the arrows, further illustrating in detail the connecting rod joint and the manner in which the inner ends of the connecting rods are attached to the engine crank shaft;

Figure 3 is a fragmentary side elevational view of another form of connecting rod wherein the inner ends are serrated or notched for interfitting movement with similarly formed tongue between adjacent connecting rods; and Figure 4 is a plan view of one of the connecting rod tongues.

In the drawing, wherein for the purpose of illustrating the invention and wherein like reference characters will be employed to designate like parts throughout the same, the reference character 5 will generally be employed to designate the cylinders of a radial type engine having reciprocably mounted therein pistons 6 having the usual wrist pins 7.

A crank shaft 8 is centrally journalled in the engine casing with respect to the cylinders 5 and said crank shaft is provided with a throw 9 to which the connecting rods 10 are attached.

Surrounding the crank shaft throw 9 are semi- circular floating members 11 forming a cylindrical or ring bearing surface for the inner ends of the connecting rods 10. The floating members 11 have spaced slots to aid in the distribution of lubricants to opposite faces thereof.

The connecting rods 10 are each provided with foot portions 12 having a bearing surface 13 adapted to engage the floating ring 11 and the bearing surfaces are arcuately curved to conform with the circular shape of the ring members 11. Lateral extensions 14 are formed on each of the connecting rod foot portions 12 as clearly shown in Figure 2 and annularly extending grooves 15 are formed in the top surface of the foot extensions for receiving two-part anchor rings 16 secured together at adjacent ends as at 17 by means of lug and bolt devices. The rings 16 maintain the parts in assembled relation but sufficient play is provided to allow relatively free movements between the parts for the flow of a lubricant.

In the form of the invention shown in Figures 3 and 4, the connecting rod 10a has a foot 12a curved coincident to the curvature of the crank shaft throw, the lateral extensions 14a thereof being grooved as at 15a. The opposite side edges of the foot 12a are serrated or notched to provide alternate fingers 18 and notches 19. A key piece or tongue 21 in the form of a curved strip to contact the floating ring 11 has opposite side edges notched as at 20 providing alternating fingers 22, the key piece to be interfitted with adjacent connecting rod heads 12a with sufficient play between the parts to allow freedom of movement and flow of lubricant.

Heretofore, engines of the radial cylinder type have required the use of connecting rods having split bearings arranged side by side upon the crank shaft throw requiring a throw of considerable length and the arrangement of the cylinders in staggered relation. That construction has been found disadvantageous in view of the fact that the engine cannot be constructed in a compact manner. The above objections and disadvantages are overcome by providing a connection between the crank throw of an engine and connecting rod as described and pointed out in the preceding disclosure.

It is to be understood that the forms of the invention herewith shown and described are to be taken as the preferred embodiments of the same and that minor changes may be made therein without departing from the spirit and scope of the invention as claimed.

I claim:—

1. A connecting rod assembly, including a plurality of connecting rods, a segment-shaped bearing member formed on the inner end of each connecting rod, slots formed in opposite sides of the segment-shaped bearing members, a slotted key interposed between adjacent bearing members for interfitting engagement therewith to permit relative sliding movements and to facilitate the flow of lubricant and a retaining ring encircling the segment-shaped bearing members for retaining the same in position.

2. A connecting rod assembly including semicircular bearing members adapted to surround a shaft, connecting rods having foot portions adapted to engage the shaft, said foot portions having slots on opposite sides, a slotted key interposed between adjacent foot portions for interfitting engagement therewith to permit circumferential movements of the foot portions with respect to each other and to facilitate the flow of lubricant and retaining rings for holding the foot portions in position upon the shaft.

CHARLES E. MILLER.